April 7, 1936.  W. A. HUDSON  2,036,942

SIFTER

Filed March 19, 1934

Wilbur A. Hudson.
INVENTOR
BY Victor J. Evans & Co.
HIS ATTORNEYS

Patented Apr. 7, 1936

2,036,942

UNITED STATES PATENT OFFICE 2,036,942

SIFTER

Wilbur A. Hudson, Indiana Harbor, Ind.

Application March 19, 1934, Serial No. 716,402

3 Claims. (Cl. 209—283)

My invention relates to sifters, and includes among its objects and advantages an improvement in and an extension of the usefulness of devices of the type employed chiefly in sifting flour for domestic purposes.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which.

Figure 1:
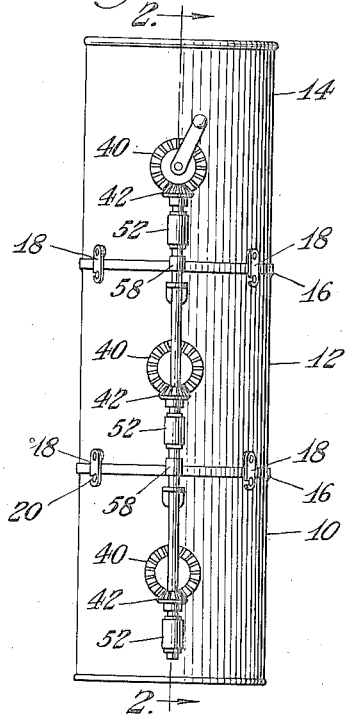
Fig. 1 is a side view of the invention.

In the embodiment selected to illustrate the invention, I make use of three cylindrical members 10, 12, and 14 arranged in end to end relation. The sections 10 and 12 have their upper ends enlarged as at 16 to receive the lower ends of the sections 12 and 14. A plurality of latch members 18 is mounted upon the sections 12 and 14 for connection with pins 20 carried by the sections 10 and 12, to connect the three sections into a unitary structure.

Figure 4:
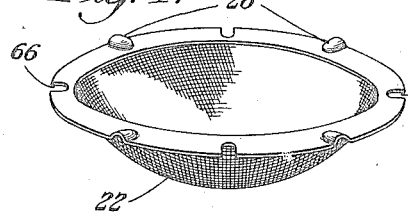
Fig. 4 is a perspective view of one of the sieves.
Figure 5:
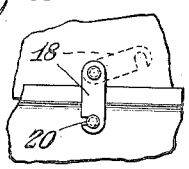
Fig. 5 is a detail of one of the latching devices for connecting the sections together.

Each of the sections 10, 12 and 14, is provided with a sieve 22 comprising screen material of a mesh such as is customarily employed for sifting flour for domestic purposes. Each screen is dished as illustrated in Fig. 4 and is provided with a metal ring 24 arranged to fit snugly within its respective cylindrical section. Referring to Fig. 4, the ring is provided with a plurality of raised portions 26 arranged to receive supporting pins 28 carried by the sections 10, 12, and 14.

An agitator 30 is associated with each of the cylindrical sections and is arranged in operative relation with its respective sieve 22. Each agitator comprises a plurality of wires 32 shaped to conform to the curvature of the screens 22. I provide shafts 34 for supporting one end of the agitators 30. These shafts project through openings in the cylindrical sections and are provided with flanges 36 to which the agitators may be welded. The opposite ends of the agitators are connected with shafts 38 having bevel gears 40 mounted thereon in close proximity to the outer wall of the cylindrical sections.

Figure 2:
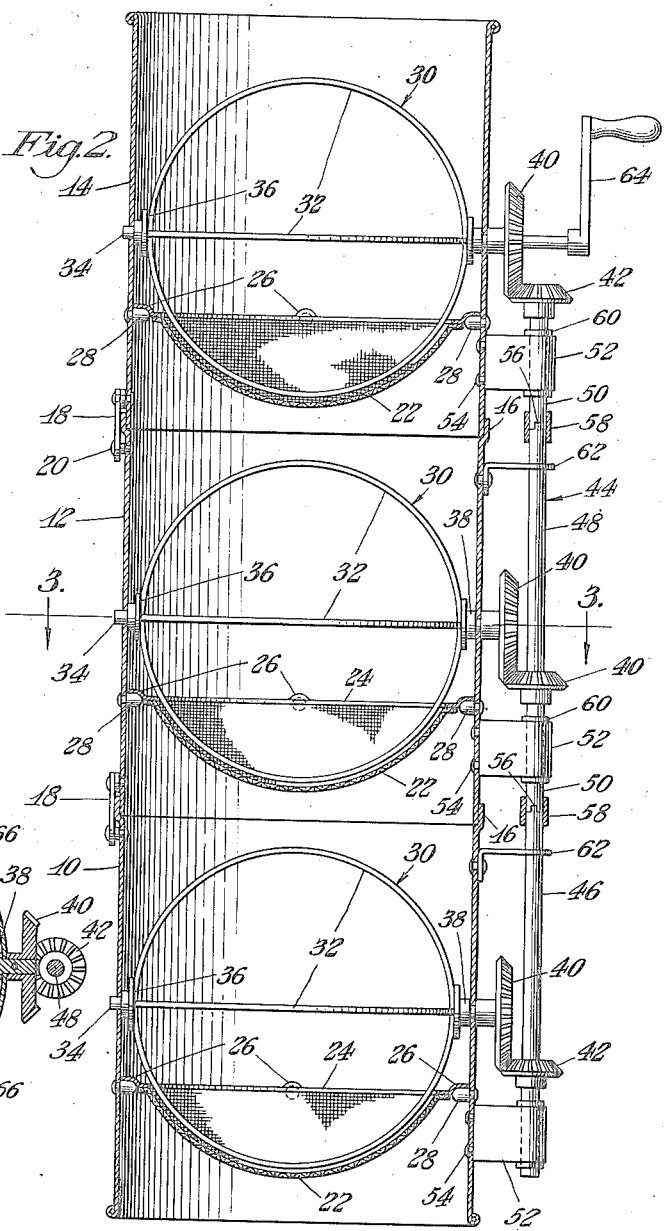
Fig. 2 is an enlarged sectional view taken along the line 2—2 of Fig. 1.
Figure 3:
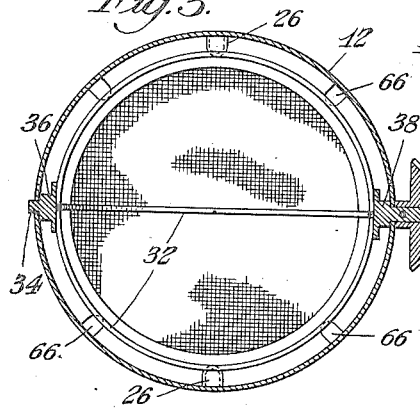
Fig. 3 is a sectional view taken along the line 3—3 of Fig. 2.

All the bevel gears 40 are arranged in mesh with bevel gears 42 mounted upon a shaft 44 comprising sections 46, 48, and 50 associated with the cylindrical sections 10, 12, and 14, respectively. Bearings 52 are fastened to the cylindrical sections by means of rivets 54 for supporting the shaft 44 in the manner illustrated in Figs. 1 and 2. Sections 46 and 48 of the shaft 44 are provided with tongues 56 co-operating with slots in the ends of the sections 48 and 50 to transmit rotary motion from one to the other.

A pair of sleeves 58 are arranged to be positioned around the joints between the sections of the shaft 44 to prevent disengagement of the parts. Flanges 60 on the shaft 44 prevent longitudinal movement of the shaft or its sections with respect to the cylindrical members 10, 12, and 14. Two brackets 62 are fastened to the sections 12 and 14 for supporting the upper ends of the shaft portions 46 and 48. A crank 64 is connected to the bevel gear 40 to transmit rotation to the shaft 44.

I cut away each of the rings 24 as at 66 to permit the sieves 22 to be connected or disconnected from the pins 28 from the lower ends of the sections 10, 12, and 14. In other words, a sieve is positioned for aligning the pins 28 with the recesses 66 and pushed beyond the pins, after which a slight rotation of the sieve aligns the raised portions 26 with the pins 28.

In operation, one or all the sections 10, 12, and 14, may be employed. When the sections are arranged in accordance with Fig. 2, all the sections co-operate to provide a unitary structure, while rotation of the crank 60 imparts rotary movement to all the agitators 30. However, should the user desire but one sieve, the section 14 may easily be disconnected from the section 12 by merely unlatching the members 18. Similarly, the section 10 may be disconnected from the section 12 and sections 12 and 14 operated as a unit. Furthermore, the section 14 may be associated with the section 10 by elimination of section 12. Thus, various sieving combinations may be attained by means of my construction. The screens 22 may be made of progressively finer mesh, if required.

It is thought from the foregoing description that the advantages and novel features of my invention will be readily apparent.

I desire it to be understood that I may make changes in the construction and in the combination and arrangement of the several parts, provided that such changes fall within the scope of the appended claims.

I claim:

1. A sifter comprising a pair of tubular sections detachably connected together as a unit, one section having its end enlarged to receive one end of the other section, latch means for connecting the two sections together, a sifting device positioned within each section, each sifting device comprising a screen and a movable agitator, a gear connected with each agitator, manually actuated means connected with one of said gears to operate the agitator associated therewith, a gear arranged in mesh with each of said first-named gears, and a sectional shaft connecting said last-named gears, to permit simultaneous operation of said agitators when said manually actuated means is operated, said sectional shaft permitting disconnection of said tubular sections and the operation of the sifting device associated with said manually actuated means to be operated as an independent unit, all said gears, said manually actuated means, and the sectional shaft, being positioned exteriorly of the tubular sections.

2. An agitator comprising a plurality of tubular sections arranged in end to end relation, latch means for connecting said sections into a unitary structure, a screen mounted within each section, a rotatable agitator mounted within each of said sections in operative relation with said screens, a gear connected with each of said agitators, an operating handle connected with one of said gears, a disconnectible shaft, and gears connecting said disconnectible shaft with said first-named gears, to operate said agitators upon rotation of said operating handle, said sections being separable, to permit the section carrying the operating handle to be operated as an independent unit, said last-named section being arranged to be connected with one or more of the other of said sections to operate the same as a unit, all said gears, said manually actuated means, and the disconnectible shaft, being positioned exteriorly of the tubular sections.

3. A sifter comprising a plurality of tubular sections arranged in end to end relation, latch means for connecting said sections into a unitary structure, a screen positioned within each of said sections, a rotatable agitator disposed within each section in operative relation with its respective screen, a gear connected with each of said sections, second gears arranged in mesh with said gears, a separable shaft connecting said second gears, a bearing carried by each section for supporting a section of said separable shaft, and an operating handle connected with one of said first gears, to operate said agitators, all said gears, said bearings, and the separable shaft, being positioned exteriorly of the tubular sections.

WILBUR A. HUDSON.